United States Patent [19]
Watson et al.

[11] Patent Number: 5,748,656
[45] Date of Patent: May 5, 1998

[54] LASER HAVING IMPROVED BEAM QUALITY AND REDUCED OPERATING COST

[75] Inventors: Tom A. Watson, Carlsbad; William N. Partlo, San Diego; Donald G. Larson, San Diego; Igor V. Fomenkov, San Diego; Anthony J. de Ruyter, San Diego; Palash P. Das, Vista, all of Calif.

[73] Assignee: Cymer, Inc., San Diego, Calif.

[21] Appl. No.: 583,302

[22] Filed: Jan. 5, 1996

[51] Int. Cl.$^6$ .................................. H01S 3/045
[52] U.S. Cl. .................................. 372/35; 372/57
[58] Field of Search .................. 372/34, 35, 57, 372/58, 109

[56] References Cited

U.S. PATENT DOCUMENTS

| | | | |
|---|---|---|---|
| 4,058,975 | 11/1977 | Gilbert et al. | 60/39.28 T |
| 4,115,998 | 9/1978 | Gilbert et al. | 60/39.09 R |
| 4,399,541 | 8/1983 | Kovats et al. | 372/36 |
| 4,502,145 | 2/1985 | Allen et al. | 372/38 |
| 4,547,885 | 10/1985 | Allen et al. | 372/38 |
| 4,573,159 | 2/1986 | Aagano et al. | 372/34 |
| 4,661,958 | 4/1987 | Bowes et al. | 372/34 |
| 4,707,837 | 11/1987 | Bennett et al. | 372/34 |
| 4,760,583 | 7/1988 | Sasnett et al. | 372/109 |
| 4,866,722 | 9/1989 | Deki et al. | 372/33 |
| 4,959,840 | 9/1990 | Akins et al. | 372/57 |
| 5,005,929 | 4/1991 | Ota | 350/6.5 |
| 5,033,055 | 7/1991 | Akins et al. | 372/57 |
| 5,084,885 | 1/1992 | Iehisa et al. | 372/34 |
| 5,091,914 | 2/1992 | Maeda et al. | 372/61 |
| 5,117,435 | 5/1992 | Cook, Jr. et al. | 372/59 |
| 5,377,215 | 12/1994 | Das et al. | 372/57 |
| 5,406,841 | 4/1995 | Kimura | 73/204.26 |
| 5,463,650 | 10/1995 | Ito et al. | 372/57 |
| 5,471,099 | 11/1995 | Larabell et al. | 307/53 |

OTHER PUBLICATIONS

Zhenhua et al., *Experimental study of the triatomic excimer $Kr_2F$ laser*, SPIE 476:36–41 (1984) (no month).

*Primary Examiner*—James W. Davie
*Attorney, Agent, or Firm*—Charles D. Holland

[57] ABSTRACT

Disclosed is a laser useful in, e.g., photolithography or medical surgery. In one embodiment, the laser comprises a discharge chamber and heat-generating electronics that are enclosed in a baffled enclosure that requires less cooling air to reliably cool the components in the enclosure than previous unbaffled enclosures. A method of reducing the amount of conditioned air is also provided. In a further embodiment, the laser has a heat-exchange system that acts quickly in response to changes in laser gas temperature by adjusting a flow-proportioning valve regulating water flow through a heat exchanger, thereby providing a continuously variable rate of heat exchange through the heat exchanger to maintain the lasing gas temperature constant. Methods of providing a laser beam and of improving the uniformity of a laser beam are disclosed, as are photolithography methods utilizing a laser and method of this invention.

36 Claims, 9 Drawing Sheets

LASER HAVING IMPROVED BEAM QUALITY AND REDUCED OPERATING COST

BACKGROUND

Lasers have been used in many applications for a number of years. Laser manufacturers have continually sought to improve beam quality and operating efficiency of their lasers in order to provide lasers that are capable of providing precise, high-energy beams at reasonable operating costs.

The computer chip industry illustrates how improvements in beam quality and efficiency of operation have been utilized. In one application, a photoresist is spun onto a substrate such as a silicon wafer and is subsequently patterned in a clean room by exposing selected areas of the photoresist to ultraviolet (UV) light. The patterned photoresist defines structures in the silicon wafer that eventually become semiconductor devices. If these structures can be defined more precisely, the structures can be made smaller and with less space between them, and, consequently, more structures or semiconductor devices can be fit into a small area. Lasers have been used to provide the UV light that patterns photoresist. A portion of the photoresist on the wafer is patterned using a burst of laser light, the wafer is quickly repositioned, and another portion of the photoresist is patterned using another burst of laser light. This process is repeated until the entire wafer has been patterned. As beam parameters such as divergence, power, and directional control are improved, semiconductor devices can be made smaller and faster, providing chips of greater operational capacity and higher speed but equivalent physical size to previous, less-powerful chips made using older lasers. Higher production speed and improved efficiency in utilizing power and consumable resources such as filtered cooling air and water reduces production costs, helping to keep computer chip prices reasonable, but also requires that the laser provide more bursts of light in a unit of time while maintaining a focused beam with little divergence and directional shift.

The medical profession has also shown a continuing need for lasers having beams of low divergence, high power, and precise directional control. For example, corneal or retinal incisions must be made accurately and quickly with minimal to no damage of surrounding tissue. Beams having improved control over their power allow quick incisions to be made to the correct depth, minimizing the time of exposure of tissue to laser light and minimizing the chances that stray incisions will occur because of equipment vibration, for example.

One laser that has been particularly useful in photolithography and in medical applications is the gas discharge laser, particularly the excimer laser, due to the highly-energetic photons emitted in the ultraviolet range of the electromagnetic spectrum. The beam from the excimer laser has sufficient energy to break chemical bonds in organic material without raising the temperature of the surrounding material. The excimer laser's ability to perform this cold photochemical action allows the system to produce laser light of the correct frequency and power to be used in photolithography or in medical applications. One commercial excimer laser 100 is illustrated in FIG. 1. An enclosure 110 houses much or all of the equipment associated with producing laser light. A commercial excimer laser uses such equipment as a discharge chamber 120 that generates the beam, a heat exchange system (a portion of which is shown at 120 in FIG. 1 or at 250 in FIG. 2) to add heat to or remove heat from the discharge chamber, a high-voltage power supply 130, a pulse power module 140, control circuitry 150, a laser gas management system that optionally includes a vacuum pump 160, and ventilation equipment such as a ventilation stack 170 that is attached to a vent or vacuum duct in the room in which the laser is located. The enclosure typically has multiple openings 180 located on multiple sides of the enclosure through which air outside the enclosure is drawn inside, but little attention has been given to utilizing the air drawn into the enclosure in an efficient manner. Many times, the gas used to produce the laser beam contains biologically-incompatible gases such as fluorine ($F_2$), so conventional thinking has been to draw large quantities of air into the enclosure and to provide multiple pathways for air to flow in an attempt to clear the enclosure of any of these gases that might be leaking from the laser discharge chamber within the enclosure. However, the increasing complexity and precision of chip manufacturing has required the air surrounding silicon wafers and therefore surrounding the lasers used to process those wafers to be essentially free of any dirt or contaminants. This air is highly filtered and conditioned to clean-room specifications and is therefore extremely expensive. It is one object of this invention to provide a laser mounted in an enclosure and having reduced consumption of this expensive air that meets clean-room standards.

The laser beam in a commercial gas laser is generated in a discharge chamber such as a discharge tube, a box-like housing, or other suitably-shaped chamber that is usually located in the enclosure. A heat exchange system is used to maintain the discharge chamber at an approximately constant temperature.

To produce the laser beam in a gas laser, gas within the discharge chamber is subjected to sufficient energy to pump electrons of atoms or molecules to a higher or excited energy state. The energetic atoms or molecules are then stimulated to emit a photon by external photons. The light generated by this stimulated emission is reflected between two mirrors, causing further stimulated emission of photons. As more photons are emitted, the power of the light beam is amplified, and when the beam reaches a threshold level of power, part of the beam passes through one of the mirrors, which is only partially reflective.

The pressure and temperature of the gas at lasing conditions are critical parameters that affect efficiency of the laser and quality of the laser beam. One method of controlling the pressure of the gas while also controlling the temperature is to provide a volume of gas that is essentially fixed by the volume of the laser chamber.

The efficiency of the laser is highest at a gas temperature selected for the particular lasing gas, normally between 35° and 55° C. The laser chamber must maintain gas temperature to better than a few degrees Centigrade for constant power output. The laser-beam's size, divergence, power, and direction are also affected by gas temperature. If the temperature of the gas is not maintained sufficiently constant, the beam can become too large, diluting the power of the beam. The beam can diverge rather than converge on the target, further diluting its power. Additionally, the beam can travel in an undesired direction, either hitting a target at an incorrect location or missing the target entirely if the temperature is not well-regulated. Careful control of gas temperature can therefore provide efficient operation of and high-quality light from a laser.

In a commercial laser, especially one operating at high powers, such as 5 W or greater, precise control of the temperature of the lasing gas is very difficult to achieve. The lasing gas is instantaneously subjected to a large quantity of energy to create excited molecules and/or atoms. For example, in a broadband krypton fluoride excimer laser, approximately 3% of the energy is converted into laser light, and much of the unused energy generates heat. Consequently, a large quantity of heat is generated in a very short period of time The resultant fast increase in gas temperature must be sensed quickly, and heat must be removed rapidly in order to maintain the temperature of the gas constant. Gas temperature also drops rapidly when the power used to generate the beam is shut off, so again the temperature change must be sensed quickly, and the rate at which heat is removed must be adjusted rapidly to maintain the gas temperature constant. Further, many industrial lasers are operated in a burst mode, wherein the beam is generated for a short period of time, followed by a short idle period while the beam's target is repositioned prior to its next burst. For example, a laser operating in burst mode may generate a beam for approximately one to a few seconds, then idle for a short period such as 0.1 to 3 seconds, at which time the cycle repeats. Thus, much of the time, a laser is in a transitory, non-equilibrium state in which control of gas temperature is very difficult.

There have been a number of systems devised to control the pressure of lasing gas. U.S. Pat. No. 5,117,435 discloses a pressure regulating system for a gas laser, wherein a thermocouple mounted to the stem of an anode that is used to provide energy to pump electrons into a more energetic state measures the temperature of the anode and controls the temperature of the anode and, consequently, the pressure in the laser, by opening a solenoid valve to admit more gas to the laser chamber. The temperature of the cooling water, which affects the temperature read by the stem-mounted thermocouple, is used to normalize the stem-mounted thermocouple's signal to compensate for the cooling water's effect on the signal from the stem-mounted thermocouple. The heat exchanger establishes the temperature of the gases within the laser, and the pressure of those gases is maintained by adding new gas in response to the anode temperature. The patent is silent on how or whether the water flowing through the heat exchanger is regulated.

Another system uses a thermocouple mounted onto the discharge chamber wall to sense changes in the wall temperature caused by heating or cooling of the gases within the chamber. Thermocouples have traditionally been located out of the presence of "pumped" hot lasing gases, especially where reactive gases such as fluorine are present, in order to prevent consumption of the reactive gas and contamination of the lasing gas with metal fluorides. The signal from the wall-mounted thermocouple is converted to a voltage that is used to open a solenoid-controlled on/off water valve for a specified period of time. The temperature of the lasing gas fluctuates because of the large lag between the time that the gas temperature increases and the time that the thermocouple senses the chamber wall temperature increase caused by the increased gas temperature. Further, the temperature of the lasing gas fluctuates approximately sinusoidally because the on/off valve provides either full flow of cooling water or no flow of cooling water.

U.S. Pat. Nos. 4,760,583, 4,547,885, 4,661,958, 4,707, 837, and 4,502,145 disclose a system for maintaining gas within a support tube supporting the mirrors and enveloping the laser discharge tube at a constant temperature, so that the support tube maintains proper alignment of the laser discharge tube and mirrors. These patents also disclose a separate system to maintain gas pressure constant to provide a laser beam of consistent quality. Temperature of the gas is measured by a thermocouple located outside the laser chamber. The thermocouple controls a solenoid on/off water valve for the heat exchanger, and cooling of the gas is controlled by varying the length of time that the water valve is opened. A portion of the gas is continually drawn out of the laser, and a pressure sensor regulates the rate at which fresh gas is introduced so that the gas pressure remains essentially constant. Temperature fluctuations within the laser itself are not sensed and therefore there is no compensation for fluctuations, since the thermocouple is located outside the laser and since the gas discharged from the laser passes through two heat exchangers before contacting the heat exchanger.

U.S. Pat. No. 5,084,885 uses the temperature of gas discharged from a gas laser and sensed at the inlet of a blower to prevent the blower from being damaged by overheating. The discharged gas is passed through a heat exchanger before it contacts the thermocouple so that heat is removed prior to the gas contacting the blower.

Other patents similarly use a temperature measurement taken on or in the laser chamber for other purposes. U.S. Pat. No. 4,573,159 uses a plurality of thermocouples mounted on laser tube mounts or support plates to control an equal plurality of fans to maintain each mount at a constant temperature to maintain proper discharge tube and mirror alignment. In U.S. Pat. No. 5,091,914, a thermocouple is used to control the ambient air temperature around a laser discharge tube when the laser is idling in order to maintain proper alignment of the mirrors around the discharge tube. U.S. Pat. No. 5,005,929 provides a way to assure a laser beam is accurately positioned by comparing the temperature near a scanner position sensor to the ambient temperature and adjusting a positionable mirror.

It is an object of the invention to provide a laser wherein the gas temperature in the discharge chamber is quickly measured to provide a laser wherein the gas temperature is quickly and accurately controlled. These and other objects and advantages are apparent from the disclosure herein.

SUMMARY OF THE INVENTION

In one embodiment, a laser is provided that includes a discharge chamber containing a lasing gas and electronics that regulate a function of the laser (for example, power-generating electronics that excite the gas to conditions sufficient to generate a laser beam) housed within a baffled enclosure. The baffled enclosure preferably provides at least a partial serial flow of clean-room air, promoting efficient use of air drawn into the enclosure and reducing the amount of air required to cool electronic equipment and to sweep out biologically-incompatible gases that may leak within the interior of the enclosure.

The invention also provides a laser that utilizes a fast-response, real-time temperature control system for the gas used to produce the laser beam. A laser so equipped has improved pulse-to-pulse stability, improved voltage stability, and increased beam quality and laser efficiency.

In one embodiment, a laser having a fast-response, real-time temperature control system comprises an enclosed chamber containing a lasing gas and a heat exchanger; a source of power that excites the lasing gas to conditions sufficient to produce a laser beam; and a fast-response temperature control system, comprising a temperature sensor constructed to provide an efficient heat transfer path, is mounted in the gas stream, along with a flow controller that continually regulates the amount of a heat exchange fluid flowing through the heat exchanger.

Among other factors, the invention is based on the technical finding that a gas laser having a fast-response, real-time temperature control system, as supplied by a sensor so constructed, mounted in the gas stream and a continuously-regulated heat exchange system, can have improved pulse-to-pulse energy stability, improved voltage stability, higher repetition rate, improved pulse-to-pulse beam quality, and/or improved efficiency in its operation. These advantages and others are apparent from the discussion herein.

DETAILED DESCRIPTION OF PREFERRED EMBODIMENTS

A commercial laser is usually contained in an enclosure housing much or all of the equipment associated with producing laser light. For example, a commercial excimer laser uses equipment such as a discharge chamber that generates the beam, a heat exchange system to add heat to or remove heat from the discharge chamber, an AC power system, a high-voltage power supply, pulsed power circuitry, control circuitry, an optional gas control module and associated vacuum pump for adding gases such as $F_2$ that are consumed during normal operation, and ventilation equipment such as a vacuum pump and/or ventilation stack and associated equipment such as a vacuum indicator and safety switch.

Air drawn into the enclosure cools components and also aids removal of laser gases that might leak into the enclosure. Baffling the enclosure reduces the amount of air that must be used to cool units within the enclosure and/or sweep the volume of gases that can accumulate within the enclosure, providing a safer laser with more economical operation. In one embodiment of the invention, a laser is provided that has an enclosure with a baffled interior so that at least part of the air that is drawn into the enclosure travels through substantially all of the enclosed volume.

Figure 1:
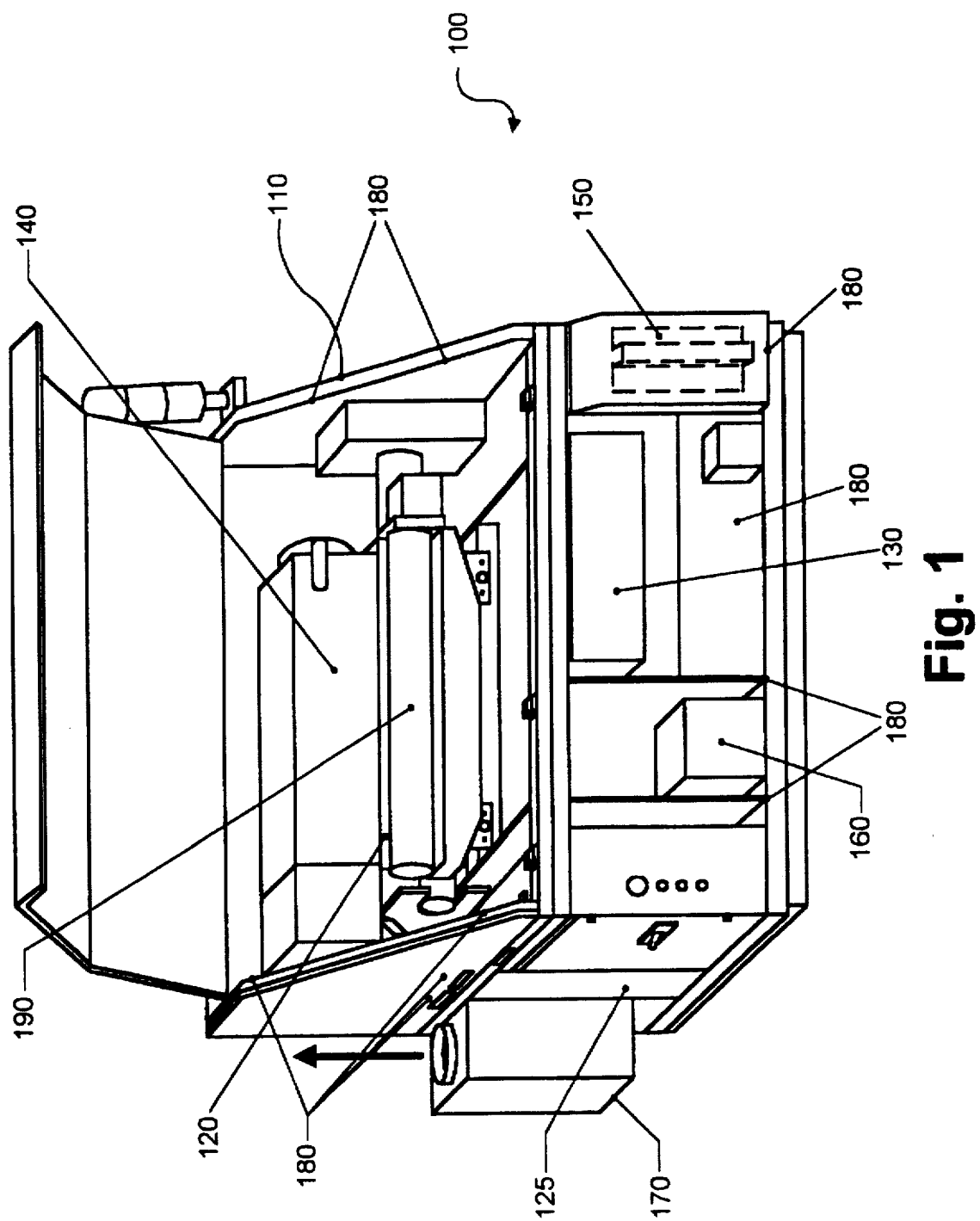
FIG. 1 shows a prior-art laser and enclosure.

FIG. 1 shows one laser of the prior art. The enclosure has multiple air inlets 180, including seams in the enclosure, and has essentially no channeling or directing of the air within the enclosure. Also, laser components such as the high-voltage power supply 130 and control electronics 150 are positioned in the enclosure for convenience of construction of the cabinet but not for maximum utilization of cooling air drawn into the cabinet. As a result, 300–400 cubic feet per minute (cfm) of air are required to effectively remove heat and to provide sufficient sweep of the enclosed volume to assure that any leaking gases are removed.

Figure 2:
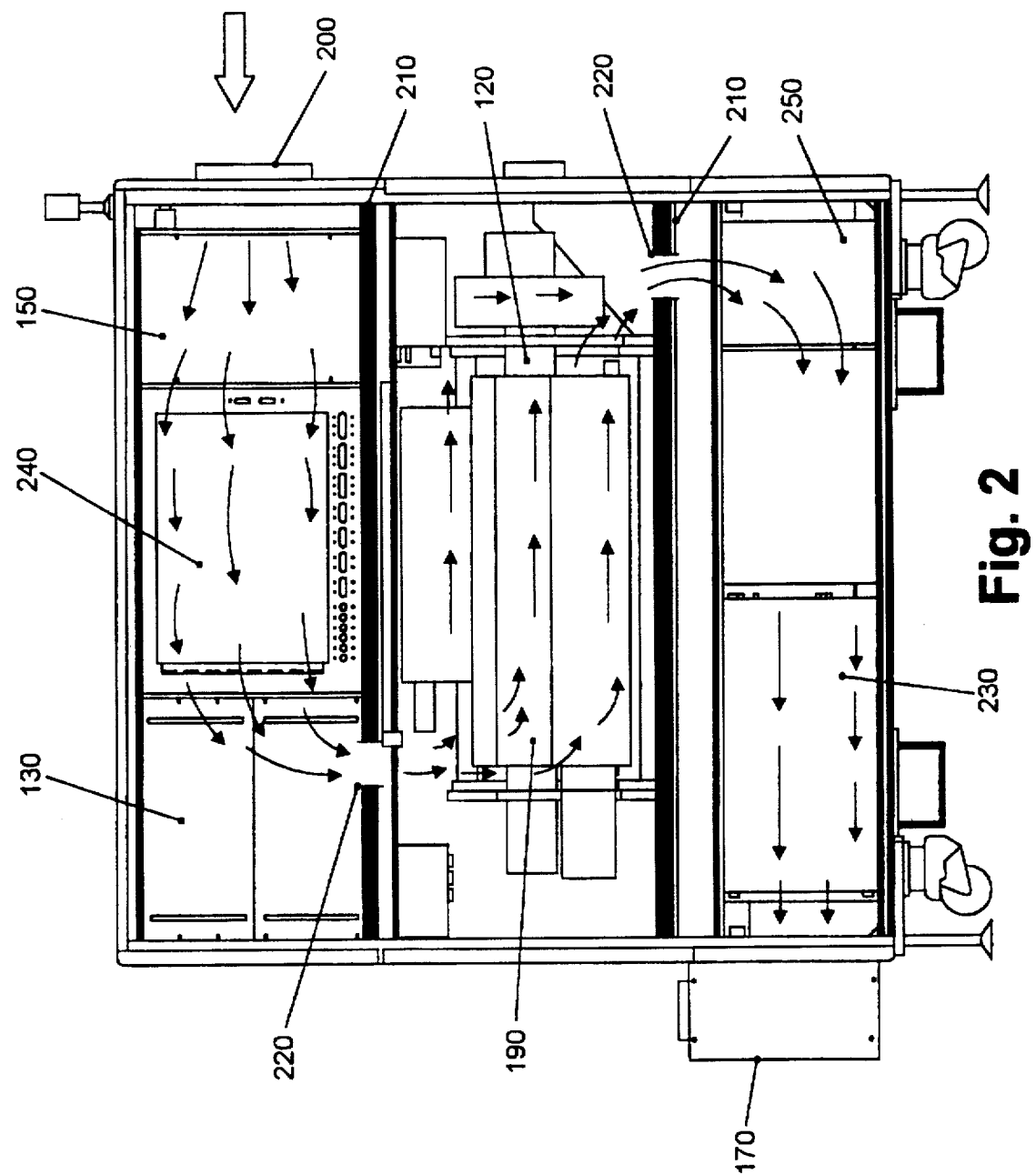
FIG. 2 shows a preferred embodiment of a laser of this invention, having a baffled enclosure.

FIG. 2 shows a preferred embodiment of a laser having a baffled enclosure. This preferred embodiment has one air inlet 200, and air entering the cabinet is forced to travel serially through substantially all of the enclosed volume before exiting through the vent duct 170. Baffling in this case is provided by solid panels 210 that divide the enclosed volume into three portions. The panels have a hole or slot 220 cut into them, allowing air from one portion of the volume to move to the next portion of the volume. Holes or slots or other types of baffles are sized and positioned to promote serial flow of at least a portion of the air through much of the enclosed volume, and preferably the air flows serially through substantially all of the enclosed volume. The preferred laser of FIG. 2 requires only 100 cfm of air instead of 300–400 cfm as required by the prior-art laser of FIG. 1. This reduction is particularly beneficial when the laser is located in a clean room as used in photolithography, since the highly-filtered and conditioned air in such cleanrooms is quite expensive and cannot be recycled because of the possibility of gas leaking within the enclosure.

The laser having a baffled enclosure is preferably a gas laser, and more preferably, the laser is an excimer laser using a noble gas halide, as disclosed in U.S. Pat. Nos. 5,377,215 and 4,959,840, which are both incorporated by reference in their entirety herein. Commercially-available excimer lasers use a wide variety of halides of noble gases, such as XeCl, KrCl, ArF, KrF, XeF, and the like. Each gaseous compound produces laser light of a characteristic wavelength.

However, the laser need not be the preferred gas or excimer laser. Any laser such as a solid-state laser, a liquid laser, or a free-electron laser may be located within the enclosure. The enclosure also does not have to house all equipment associated with the laser, but preferably the enclosure houses at least the discharge chamber 120, makeup gas module 230 (where utilized), and components that generate the most heat, such as the AC power system 240 and the high-voltage power supply 130. Preferably, equipment that is most sensitive to heat or that generates substantial heat is mounted in the coolest air initially drawn into the housing enclosure, as shown in FIG. 2, and components that tolerate warmed air are located downstream. Multiple air inlets may be used to admit amounts of cool air at critical locations, and multiple baffles may be used to either direct air to certain components or to have a portion of the air move to a second portion of the enclosed volume without sweeping substantially all of the enclosed volume. Air should be channeled and directed to flow within the interior of the enclosure by baffles to a sufficient extent that the amount of air needed to establish a cooling-flow path to remove heat from the heat-generating components and to sweep the enclosed volume is reduced from the amount of air required when no baffles are present. The enclosed volume is preferably operated under negative pressure to prevent egress of gases such as $F_2$, although the interior of the enclosure may be at or above atmospheric pressure. Preferably, the enclosure is well sealed along joints to control ingress of air in unwanted locations, and the doors of the cabinet may be sealed using silicone rubber gaskets. The panels dividing the enclosed volume into portions can be used to support equipment as well as to act as baffles, and the panels are preferably sealed along their edges with silicone gaskets.

Many times, a laser needs to be adjusted during operation. This requires opening the enclosure doors, which in turn could cause loss of air circulation. To continue to provide air circulation during laser adjustment, the laser and associated equipment in the enclosure can be located behind clear plastic panels that are secured to the panels and enclosure on the door side of the enclosure using silicone gaskets (not shown in the figures for sake of clarity of the figures). Rubber flaps can be used over access holes in the plastic panels which, when lifted, permit a person to reach into the enclosed volume without substantial loss of circulation of air throughout the enclosed volume. Other service access closures are also possible, such as hinged doors and sliding or rotating covers. The ventilation connection 170 may contain a pressure-sensitive switch and indicator to monitor pressure and shut-off the laser if the pressure within the enclosure becomes too high.

For a gas laser such as an excimer laser, an enclosure typically houses such equipment as a gas laser discharge chamber and a heat exchange system. The discharge chamber contains gas used to produce the laser beam and also usually contains at least some of the equipment that pumps electrons into higher energy states, such as electrodes that generate a corona discharge or guide-tubes for e-beam or microwave introduction into the chamber.

Figure 3:
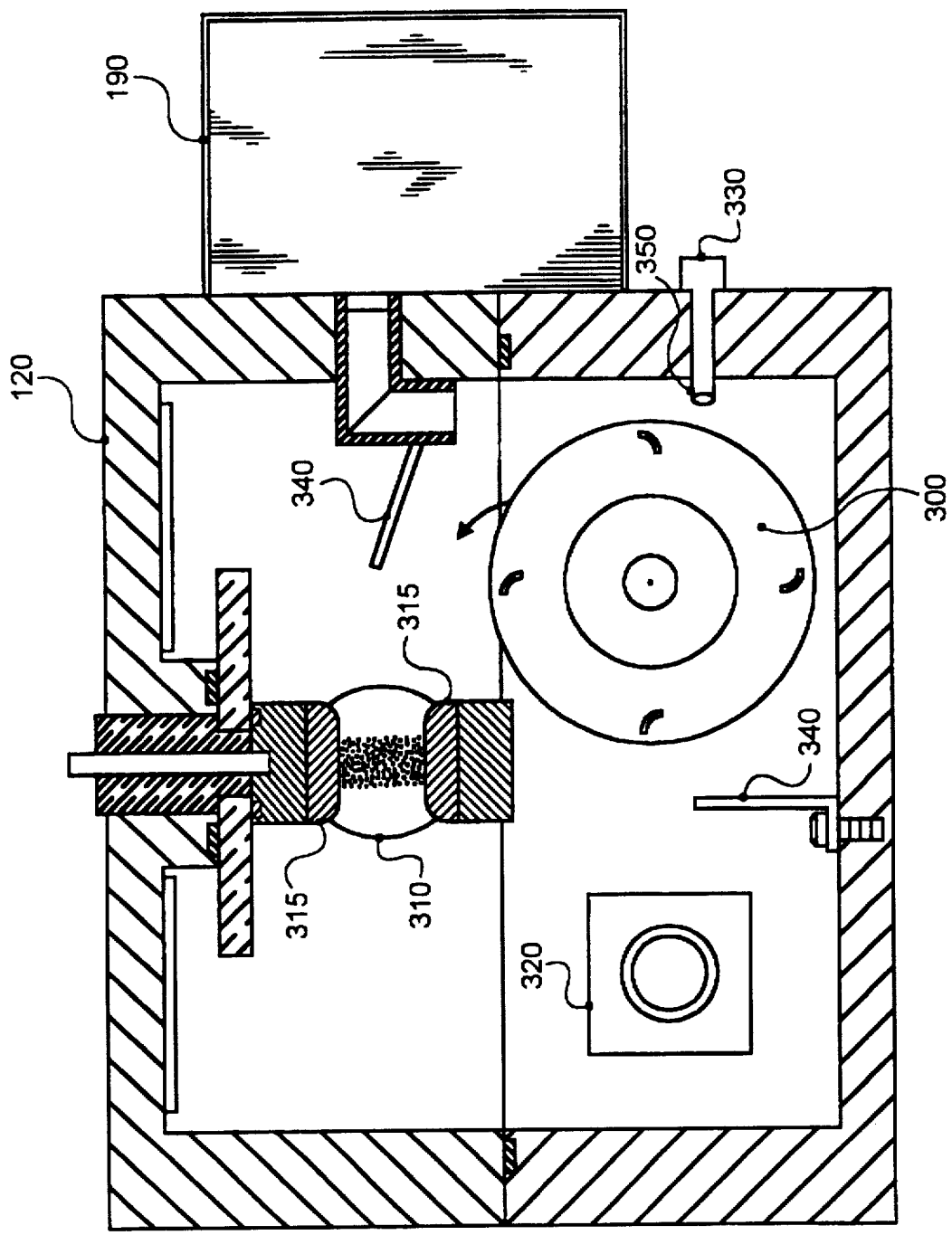
FIG. 3 shows a laser discharge chamber having a gas temperature sensor.

FIG. 3 shows another preferred embodiment of the invention, wherein one embodiment of a fast-reacting gas temperature control system is utilized. A fan 300 circulates gas in the discharge chamber into an electrical or glow discharge volume 310 created by electrodes 315 and past a heat exchanger 320 that removes heat that was introduced into the chamber by pumping electrons to their higher-energy states. The temperature of the gas is measured by a temperature sensor and monitored by a microprocessor-based controller, such as that disclosed in U.S. Pat. No. 5,377,215, incorporated herein by reference, which receives a temperature signal from a temperature sensor 330, modified as discussed infra, that extends a sufficient distance into the moving gas stream in the discharge chamber to read the temperature of the main portion or bulk of the gas. Although the temperature sensor is shown in FIG. 3 to be located near the discharge of the fan, the temperature sensor may be located in any portion of the gas flow that is not stagnant or where the temperature is representative of the temperature of the bulk of the moving gas that is being subjected to the pumping energy source, provided it is placed sufficiently away from the wall to avoid boundary layer effects, which those skilled in the art will recognize will be dependent upon operational conditions. In this way, temperature fluctuations of the gas nearest the excited gas molecules are directly measured. The discharge chamber may contain baffles 340 that help to assure a generally circular gas-flow pattern in the discharge chamber. The temperature sensor may be a thermocouple or preferably a semiconductor temperature sensor that provides a signal indicative of the temperature sensed, such as a Model AD590 semiconductor device made by Analog Devices, and may be placed within a halide-resistant thermal well 350, such as a type 304 or 316 stainless-steel thermal well. The thickness of the thermal well should be minimized to allow for effective and rapid heat transfer, while sufficient in thickness, based upon operational constraints, to protect the sensor in the harsh chamber environment. For use in an excimer laser system, the thermocouple or semiconductor device is preferably attached to the thermal well using a thermally-conductive epoxy glue. A temperature sensor modified to facilitate rapid heat transfer and establish an efficient heat flow path situated in the gas stream, as discussed above, provides a real-time temperature-indicating signal that responds quickly as the temperature of the enclosed gas varies. It is to be noted that in order to provide a rapid response time, preferably less than five (5) seconds, and a direct temperature measurement without the need to compensate for the time lag due to thermal propagation through the relatively thick sensor housing materials used in the prior art, the present invention modifies the conventional sensor design by providing a combination of thermal well material having a small thermal time constant in conjunction with the thermally-conductive epoxy glue. Utilization of a conventional sensor disposed in a gas stream provides a better temperature measurement than sensors disposed in the chamber wall, but are still not sufficient to provide the rapid temperature measurement of the gas in real-time, as provided by the present combination. Consideration must be made to provide an efficient heat path to allow for the real-time measurement of the gas temperature without the inherent thermal lag of conventional designs. An example of the effectiveness of the temperature sensor combination of the present design as compared to conventional sensors, which do not anticipate the need for an efficient heat path, is the speed with which different temperature sensors respond and their ability to maintain temperature within the enclosure constant as illustrated in FIGS. 4 and 5.

Figure 4:
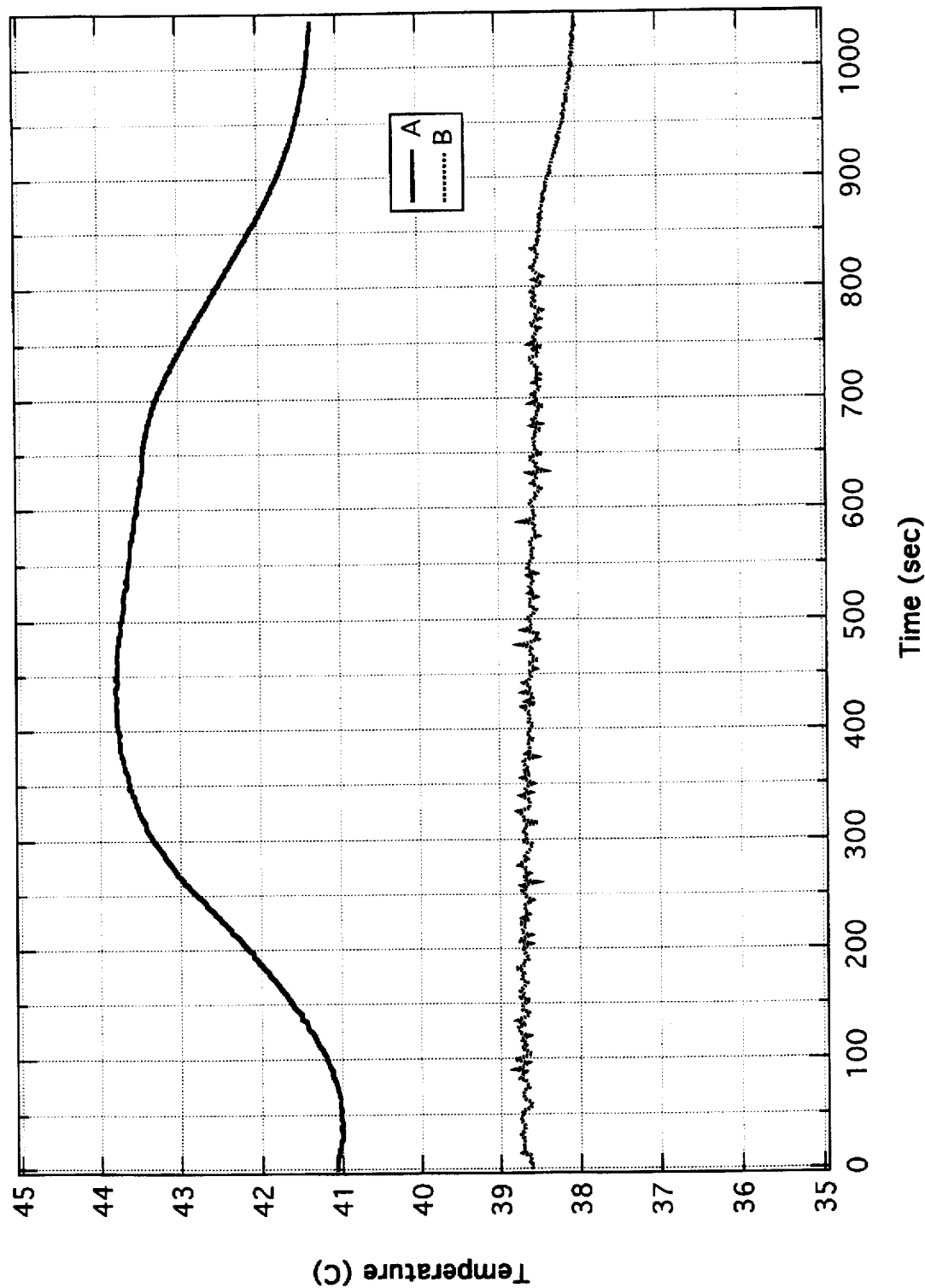
FIG. 4 shows chamber wall temperature as measured by a wall temperature sensor when the wall sensor and the gas sensor are individually used to control lasing gas temperature. The ordinate is time in seconds, and the abscissa is temperature in degrees centigrade.
Figure 5:
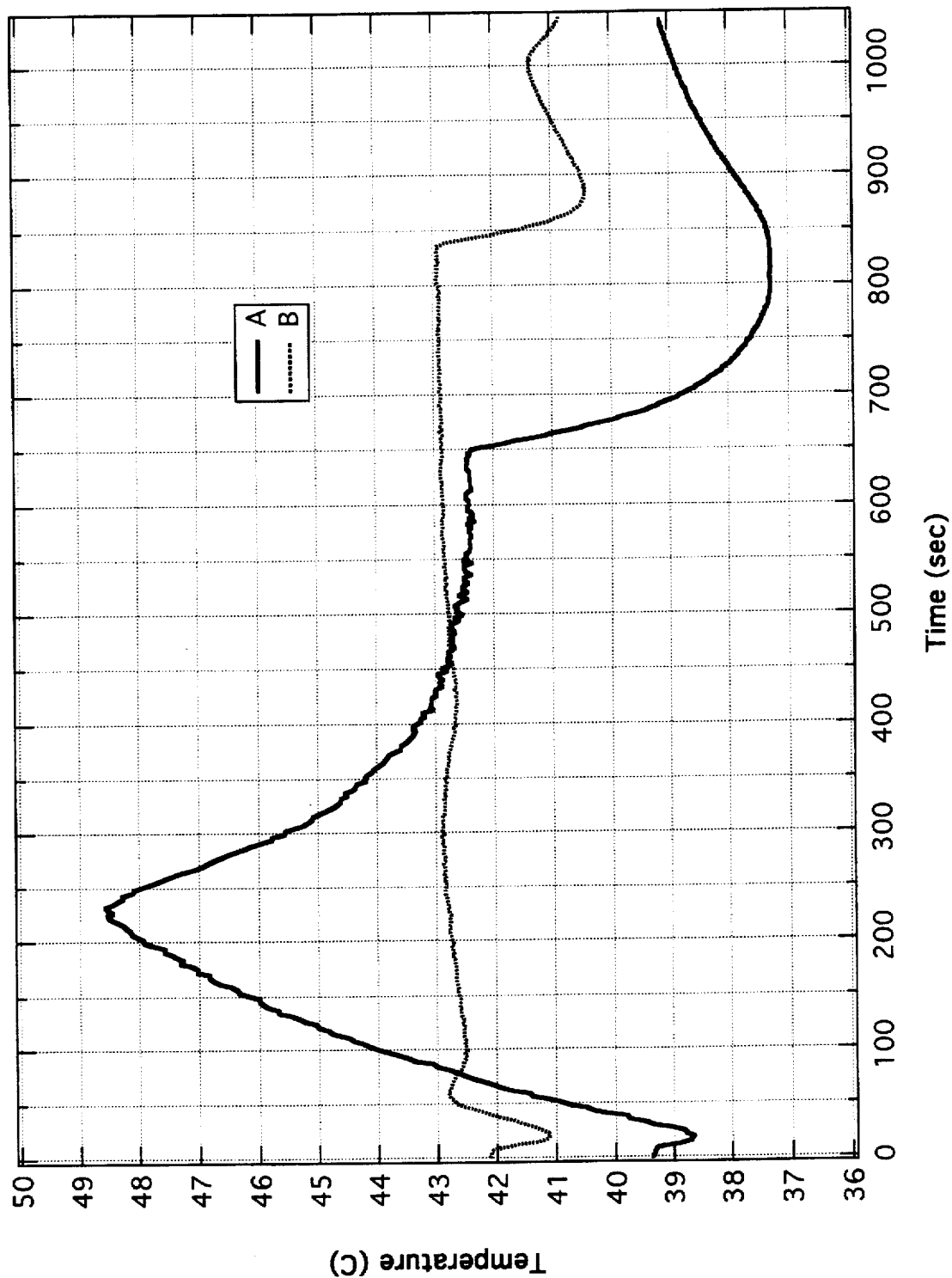
FIG. 5 shows gas temperature as measured by the gas temperature sensor when the wall sensor and the gas sensor are individually used to control lasing gas temperature. The ordinate is time in seconds, and the abscissa is temperature in degrees centigrade.
Figure 6:
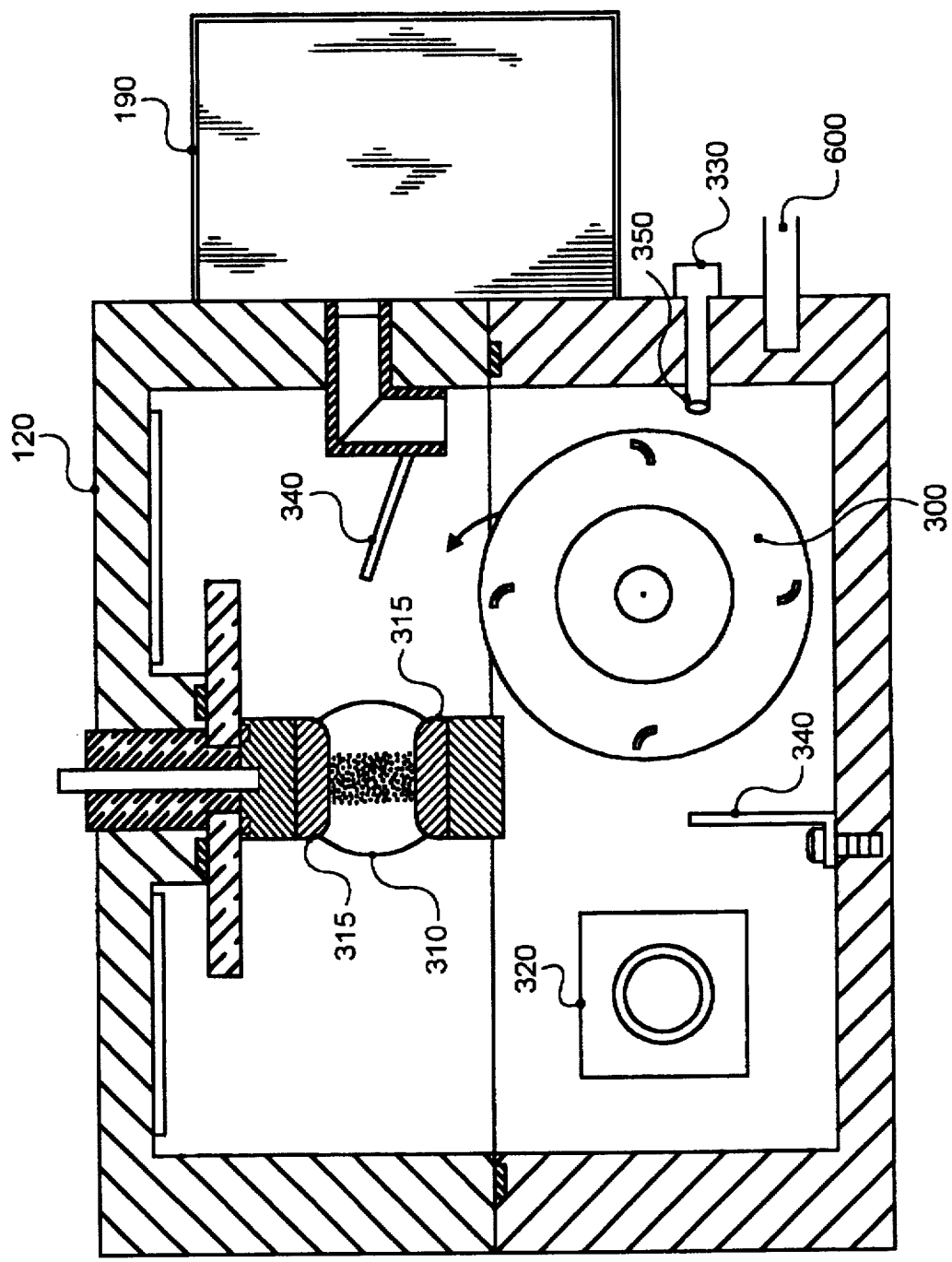
FIG. 6 shows a laser having a wall temperature sensor and a gas temperature sensor, so that both temperatures could be measured simultaneously to generate the data used in FIGS. 4 and 5.

FIGS. 4 and 5 were generated with equipment as illustrated in FIG. 6. As shown in FIG. 6, two temperature sensors were attached to the discharge chamber. One temperature sensor 600 (the "wall sensor") was recessed into the chamber wall but not through it, in order to provide a thermal lag time as found in prior-art laser designs where the chamber wall temperature was used as an indicated measure of chamber gas temperature. As previously discussed, the measured temperature in this sensing configuration will lag behind the true chamber gas temperature as a result of the transfer time for heat to propagate through the chamber wall, as will be shown herein. The other temperature sensor 330 (the "gas sensor") designed in accordance with the present invention, is extended through the chamber wall and into the moving gas within the laser discharge chamber. The output from the selected temperature sensor went to a microprocessor-based controller that controlled how long a solenoid-controlled water valve that supplied cooling water to the heat exchanger in the laser chamber was opened and closed.

FIG. 4 shows chamber wall temperature as measured by a wall sensor. Line A shows the wall temperature when the wall sensor was used to control gas temperature. Line B shows the wall temperature when the gas sensor controlled gas temperature. Line A shows that wall temperature gradually increased to the desired temperature when the laser was operated and was maintained at the desired temperature for a very short period, then subsequently gradually decreased to a desired idle temperature when the wall sensor was used to control gas temperature. Line B shows that wall temperature increased slowly but remained essentially constant for a long period of time when the laser was operated, then decreased slowly after the laser was shut off.

FIG. 5 shows gas temperature as measured by the gas sensor. Line A shows the gas temperature when the wall sensor was used to control the gas temperature.

Gas temperature rose rapidly and essentially uncontrolled until the wall temperature (shown in FIG. 4 Line A) increased sufficiently that the wall sensor sensed an increase in temperature, at which time the rapid temperature rise was reversed and was followed by followed by a rapid temperature decrease. The gas essentially equilibrium temperature before the laser was turned off. Line B shows the real-time gas temperature when the gas sensor of the present design was used to control gas temperature. Gas temperature quickly rose and attained an equilibrium value. Gas temperature was well-controlled during laser operation.

Figure 7:
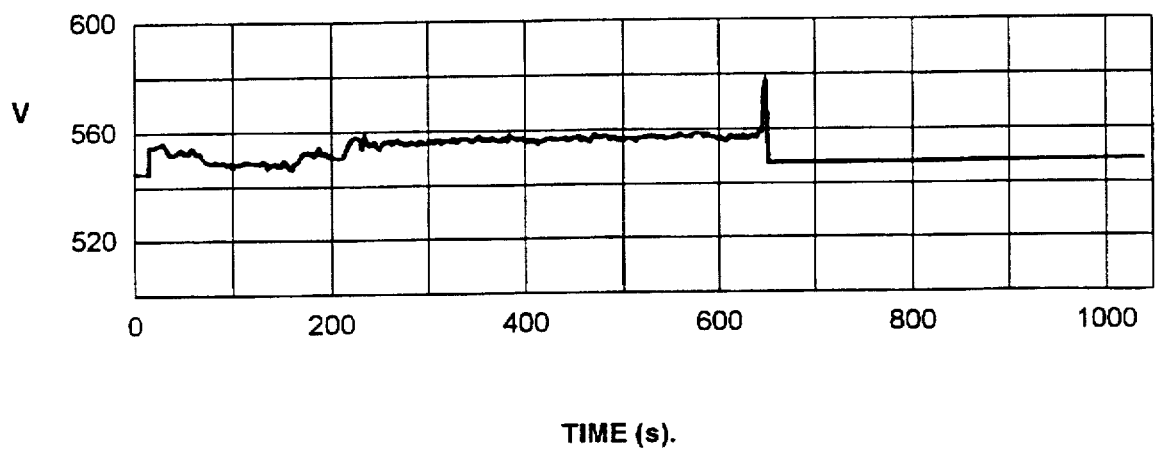
FIG. 7 shows the variance of laser electrode voltage during laser operation when the wall temperature sensor and the gas temperature sensor are individually used to control lasing gas temperature.
Figure 7:
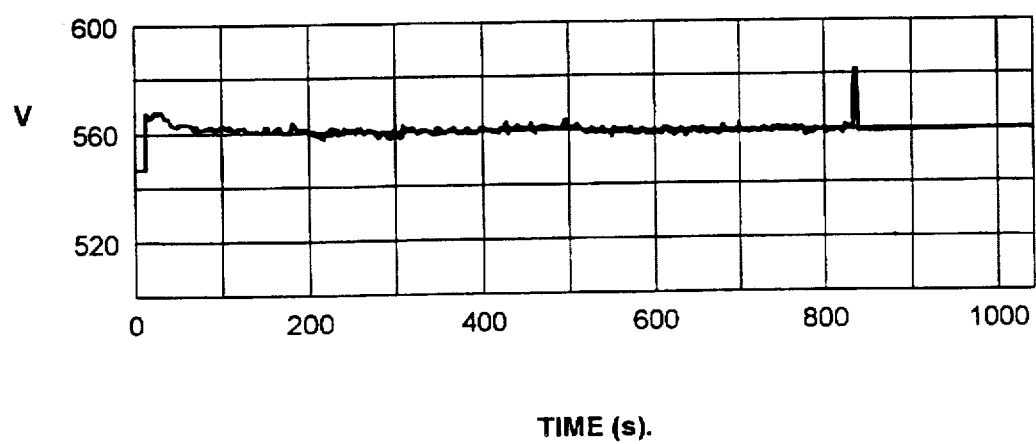
Figure 8:
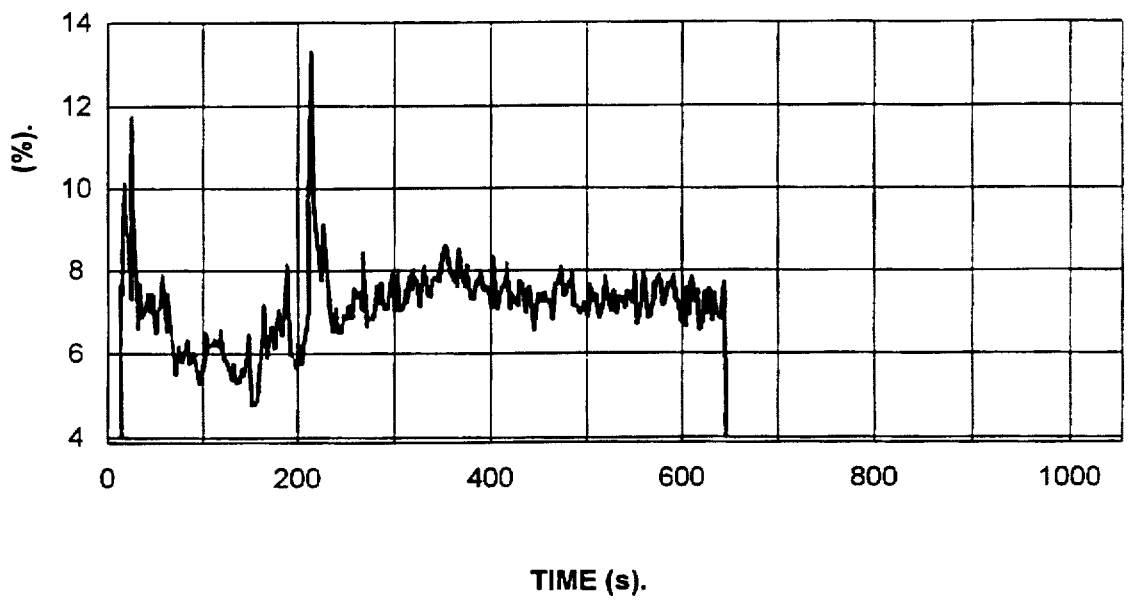
FIG. 8 shows the variance of laser beam energy during laser operation when the wall temperature sensor and the gas temperature sensor are individually used to control lasing gas temperature.
Figure 8:
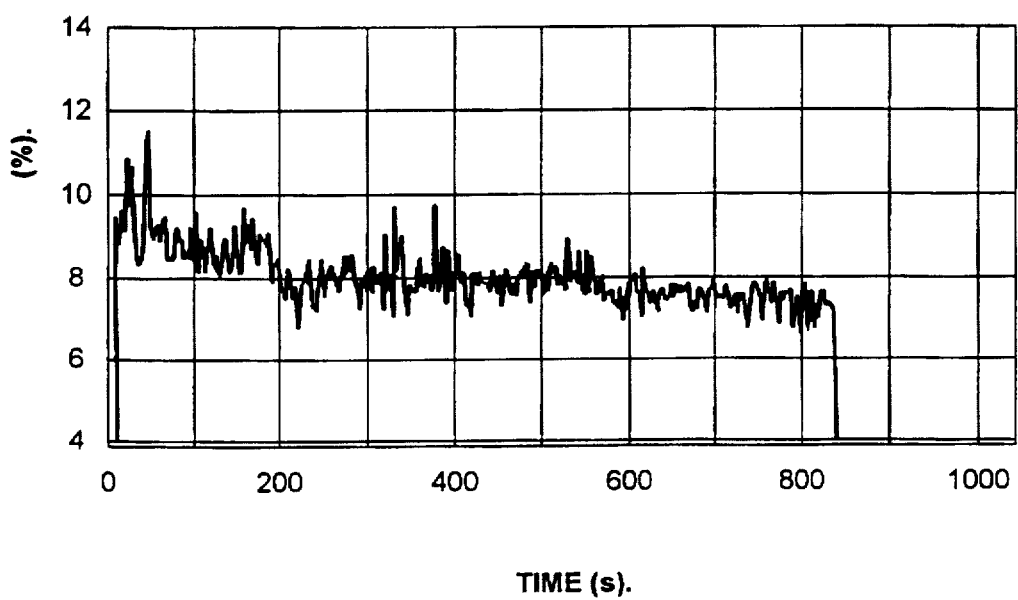

The effects of these modes of gas temperature control on critical laser performance parameters are shown in FIGS. 7 and 8. In FIG. 7, line A shows electrode voltage when the output from the wall sensor is used to control gas temperature. Voltage was unsettled during much of the time the laser was operating. Line B shows electrode voltage when the output from the gas sensor is used to control gas temperature. Electrode voltage was essentially constant during operation of the laser. Constant voltage during laser operation indicates that the gas within the laser is being excited essentially uniformly during the time that the laser is operated. Uniform excitation provides a more consistent laser beam that is essential to precise photolithography.

FIG. 8 shows the variance of laser beam energy during laser operation. Large peaks are to be avoided, since large peaks indicate greater variance in laser beam power. Line A shows that control of gas temperature using the wall sensor caused substantial peak variances in beam power, whereas line B shows that control of gas temperature using the gas sensor reduced peak variances in beam power, providing a more consistent laser beam.

Locating a temperature sensor which is constructed to provide an efficient heat transfer path and provide real-time measurement of the temperature of the gas stream improves the microprocessor control system's ability to control the temperature of the gas and, consequently, the beam quality. This also allows improved control over adding gases that are consumed during operation of the laser. A system for replenishing gases consumed during operation is disclosed in U.S. Pat. No. 5,450,207, assigned to the present assignee and is incorporated by reference in its entirety herein.

Increases/decreases in electrode voltage can be monitored over time to determine when additional reactive gas is needed in the laser chamber. When the signal from a wall sensor is used by a gas temperature control system to control gas temperature, it is difficult to use electrode voltage changes as a basis to determine when to add more gas. Consumable gases such as $F_2$ react with materials at higher rates when temperature is increased. When a wall sensor is used to measure gas temperature and thereby control the gas temperature, the gas temperature goes much higher than the desired operating temperature, and reactive gas is consumed at a higher-than-desired rate. When the laser approaches equilibrium, more of the reactive gas has been consumed than desired, to the detriment of stable laser operation and, as seen from FIG. 7 line A, electrode voltage is unstable over much of the operation of the laser because of temperature variations. Complicated control strategies and algorithms are necessary to enable the control system to use change in electrode voltage over time to determine when to add reactive gas, especially since a laser may never reach true equilibrium during operation in a commercial setting.

When a gas sensor is used to measure gas temperature, the control system can maintain the gas temperature very near to the desired temperature during laser operation. Gas is consumed at a consistent rate, and as seen from FIG. 7 line B, electrode voltage is essentially constant during laser operation. Change in electrode voltage over long periods of time can be used to indicate when reactive gas needs to be added to gas contained in the laser chamber. Use of a gas sensor can therefore lead to a more consistent laser beam over the life of the gas within the laser chamber.

Figure 9:
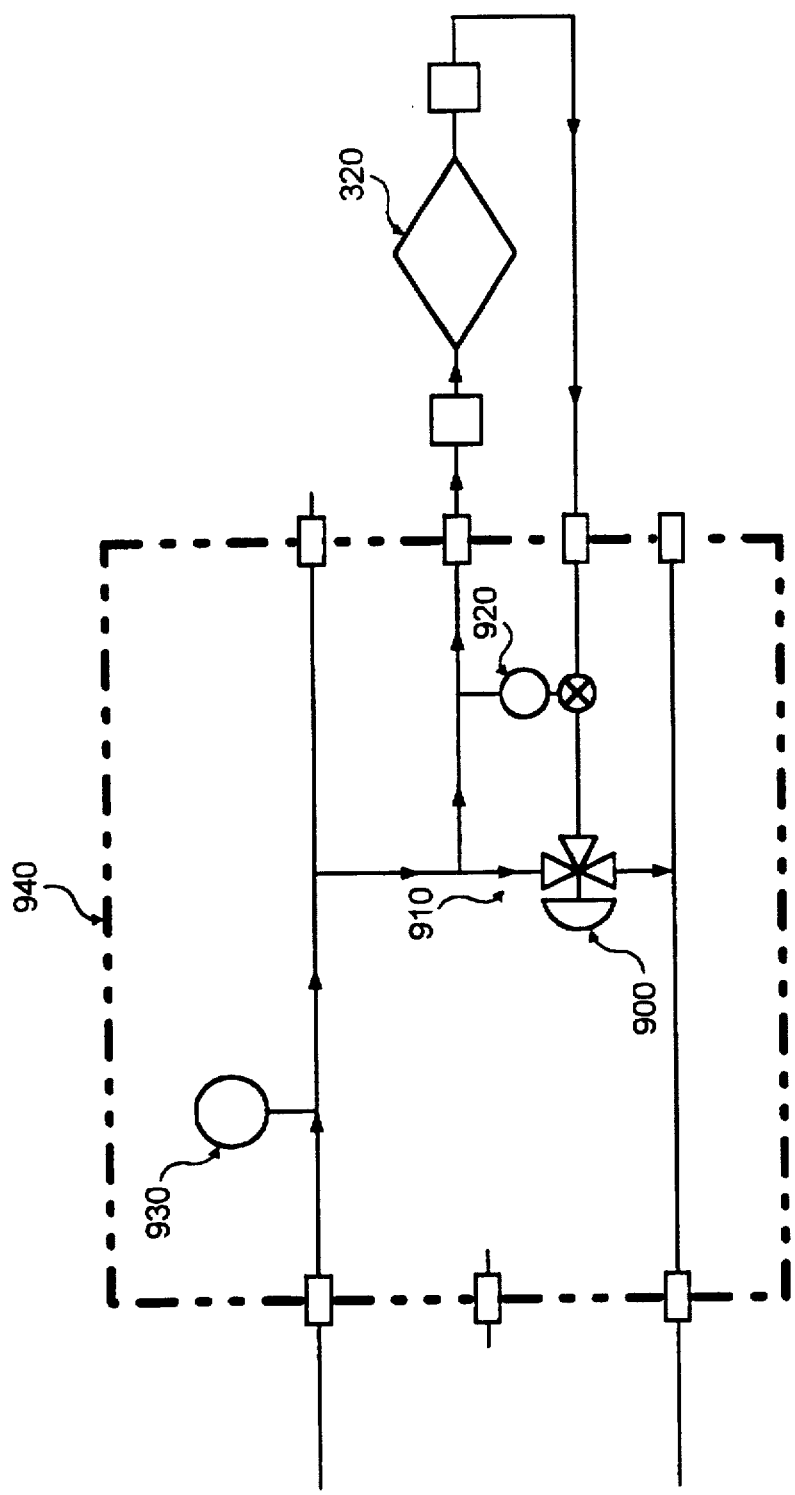
FIG. 9 shows a preferred system for providing a fast-reacting gas temperature control system that varies water flow in response to a signal from a thermocouple or other lasing gas temperature sensor by using a proportioning valve for water flow through a heat exchanger.

Even where a gas sensor is used, control over gas temperature can be further improved by redesigning the heat exchange system to allow the control system to vary cooling water flow continuously in response to the temperature sensor's signal instead of varying cooling water flow in a pulse fashion by opening and closing an on/off valve. FIG. 9 shows a preferred system for the control system to vary water flow in response to a signal from a temperature sensor.

In FIG. 9, the signal from a temperature sensor passes to a microprocessor-based controller that can continuously monitor the change in gas temperature from a desired set-point and send a signal to a proportioning valve 900, which varies the flow of water into the heat exchanger and maintains the gas temperature at the desired setpoint. The proportioning valve shown in FIG. 9 is a 3-way proportioning valve which splits the in-flowing water into two streams: one that flows through the heat exchanger 320, and one that flows through a bypass 910. Water returns to a water supply tank or otherwise discharges for recycling. Water flow through the proportioning valve can be changed to any water flow rate desired based upon system operating requirements.

A proportioning valve permits continuous adjustment of the flow of water into the heat exchanger. Transient conditions such as turning the laser beam on or off can be handled by large changes in water flow-rate to maintain gas temperature constant, and minute changes in water flow rate maintain the temperature of the gas constant under steady-state conditions. The on/off valve of the prior art permitted only full flow of cooling water or no flow of cooling water, causing sinusoidal variations in gas temperature and making laser performance less effective and less efficient, as discussed previously. The use of a proportioning valve in the heat-exchange system eliminates the see-sawing of gas temperature that results from pulsed water flow. Use of a proportioning valve also provides more reliable operation, especially when a gas sensor is used. The instantaneous changes in temperature read by a gas sensor can cause the control system to either pulse an on/off water valve so frequently that the valve fails prematurely, or to induce further temperature fluctuations because of the time lag in the valve's duty cycle of operation required by of the valve's on/off nature.

The proportioning valve is preferably a quick-acting valve such as a pneumatically-actuated valve, such as those manufactured by Johnson Control, although an electrically-actuated or magnetically-actuated valve may be used, provided the valve provides a smooth proportioning control response over the entire stroke of the valve, and can provide a lock-to-lock activation time of 0.5 second or less. The valve illustrated in FIG. 9 is a 3-way valve using a constant flow-rate of water to the laser, which simplifies the design of facilities that will house the laser, such as the design of the photolithography clean-room in which the laser is housed and associated utilities such as peak water flow rate that must be provided. As illustrated, the valve is preferably positioned downstream to allow the overall system to be placed under constant pressure, thereby allowing the purging of gasses, etc., from the lines. To accommodate this pressure, the lines are preferably Teflon® with stainless steel braiding to accommodate high temperatures (of about 400° F.) and moderate pressure (of about 300 psi). However, the proportioning valve may be a 2-way pinch-valve or a ball valve, needle valve, or other throttling valve, for example. A varying water flow may also be provided by a variable-speed pump whose pumping rate is controlled by the output signal from the temperature sensor or a controller. The fluid used for the heat exchanger may be any fluid having the desired properties such as heat capacity and boiling point to permit its use as a heat exchange medium. Other fluids that can be used are liquids such as oils and synthetic heat-exchange fluids and gaseous fluids such as air and nitrogen. The heat exchanger is preferably a liquid-to-gas heat exchanger, and the heat exchange fluid is preferably water because of its availability and its good heat-exchange properties. The temperature sensor is preferably a semiconductor temperature sensor (or gas thermocouple) as discussed previously, located within the flowing laser gas stream, although the temperature sensor may be located in other positions that can be used to indicate the temperature of the gas to be "pumped" to create the laser beam. However, temperature may also be read using other remote temperature sensors, such as an infrared detector that produces a signal indicative of the temperature read by the device.

In other preferred embodiments, the heat exchange system contains additional components that monitor the flow rate 920 and/or temperature 930 of water passing through the heat exchanger used to cool the laser gas. The flow rate and/or temperature of water can be used in conjunction with the gas temperature signal to adjust the position of the 3-way valve or other cooling-water flow regulating device to provide faster and more accurate control. For instance, the temperature of cooling water and the temperature of the lasing gas may be used to activate a controller, such as an E/P transducer, such as those manufactured by Fairchild, to adjust the percentage of flow through the system measured at sensor 920 both be used to adjust the 3-way valve to provide the flow rate of cooling water needed to maintain the temperature constant while allowing the remaining flow to follow a closed loop within the system.

In this way, flow regulation is more precisely controlled through linear increases rather than fluctuation spikes as previously described, thereby eliminating temperature modulation of the system. Use of other control signals generated by appropriate sensors such as cooling-water temperature and/or flow rate allow faster and more accurate response to gas temperature fluctuations.

In another preferred embodiment, all of the components in the cooling-water stream that are outside the discharge chamber are located in one sub-assembly (shown as box 940 in FIG. 9) that can be placed inside or outside the enclosure housing the laser. Such equipment as the cooling-water temperature sensor, flow sensor, and 3-way valve can be located together in the sub-assembly to simplify construction of the laser, to locate the components away from electrical components, and to provide a quick way to determine the location of faulty components such as a leaking flow-sensor or 3-way valve, providing improved reliability and safety and fast maintenance turn-around time. The sub-assembly may be enclosed or may be an open sub-assembly having single or multiple supports for the equipment of the sub-assembly. Piping may support some or all of the equipment of the sub-assembly.

In the preferred embodiments discussed above, the gas heat exchanger uses water to cool the laser gas, and the gas is initially warmed or maintained at approximately laser operating temperature by heating elements well-known to those skilled in the art, which are located on the outside of the discharge chamber. If desired, the heating elements of the heat exchange system can be eliminated by providing heating and cooling water to the heat exchanger and controlling the flow of each with control valves. The gas temperature during idling periods may be somewhat lower than the desired gas temperature when producing the laser beam, since "pumping" the gas to produce a laser beam creates sufficient heat to warm the gas to the desired temperature almost instantaneously.

In an alternative embodiment, when the laser is non-operational, the initial temperature drop indicated by C in FIG. 7, resulting from the cooling effect of residual water acting on the gas faster than the thermal effects of external heating elements, can be offset by utilizing a heating element incorporated directly into the discharge chamber. This heating element, such as a rod element, should preferably utilize the same power capacity used for initiating laser discharge to allow quick heating of the gas during inoperative periods. The heating element should likewise be manufactured from a material compatible with the chamber gases used in the particular laser system, such as fluorine in the case of an excimer laser system.

While the invention has been described in connection with what is presently considered to be the preferred embodiments, it is to be understood that the invention is not limited to the disclosed embodiments, but on the contrary, covers various modifications and equivalents included within the spirit and scope of the following claims. Therefore, persons of ordinary skill in this field are to understand that all such equivalents are included within the scope of the claims.

We claim:

1. A laser comprising
 a) a discharge chamber for generating a laser beam;
 b) a lasing gas within said discharge chamber;
 c) a temperature sensor positioned to read the temperature of said lasing gas and thermally optimized by utilizing materials having a small thermal time constant, to generate a real-time temperature signal indicative of the lasing gas temperature; and
 d) a heat exchange system positioned to add heat to or remove heat from the lasing gas, wherein the heat exchange system comprises a heat exchanger whose rate of heat exchange is continuously variable in response to the temperature signal, and the rate of heat exchange is adjusted in response to a real-time temperature signal from the temperature sensor.

2. The laser of claim 1 wherein the lasing gas comprises a noble gas halide under lasing conditions.

3. The laser of claim 1 wherein the heat exchange medium of the heat exchanger comprises a liquid which removes heat from the lasing gas.

4. The laser of claim 3 wherein the laser further comprises a housing and the heat exchange system comprises components through which the heat exchange medium flows, at least one of which components is positioned within the discharge chamber and at least one of which components is positioned outside the discharge chamber but within the housing, and wherein the components that are positioned outside the discharge chamber but within the housing are positioned within a sub-assembly.

5. The laser of claim 3 wherein the heat exchange system further comprises a flow-proportioning valve through which said liquid flows and wherein the flow of said liquid is controlled by the flow-proportioning valve.

6. The laser of claim 5 wherein the flow-proportioning valve is a 3-way valve.

7. The laser of claim 5 wherein the temperature sensor is a temperature sensor located in the lasing gas within the discharge chamber.

8. The laser of claim 5 wherein the lasing gas comprises a noble gas halide under lasing conditions.

9. The laser of claim 7 wherein the lasing gas comprises a noble gas halide under lasing conditions.

10. The laser of claim 1 wherein the temperature sensor is a thermocouple located in the lasing gas.

11. The laser of claim 1 wherein the temperature sensor is a semiconductor temperature sensor located in the lasing gas.

12. The laser of claim 1 wherein the temperature sensor is located in the portion of the lasing gas that is representative of the temperature of the bulk of the lasing gas that is being subjected to the energy that pumps electrons to an excited state.

13. The laser of claim 12 wherein the temperature sensor is a thermocouple.

14. The laser of claim 12 wherein the temperature sensor is a semiconductor temperature sensor.

15. The laser of claim 14 wherein the thermocouple is positioned in the lasing gas within the discharge chamber.

16. The laser of claim 14 wherein the semiconductor temperature sensor is positioned in the lasing gas within the discharge chamber.

17. The laser of claim 16 wherein a rod-type heating element is disposed in said discharge chamber to maintain the lasing gas temperature during inoperation of said laser.

18. A method for improving the uniformity of a laser beam of a laser having a discharge chamber, a volume of lasing gas within said discharge chamber, a temperature sensor positioned to read the temperature of said lasing gas and which generates a temperature signal indicative of the lasing gas temperature, and a heat exchanger positioned to add heat to or remove heat from the lasing gas, said method comprising comparing the lasing gas temperature as indicated by the temperature signal to a set-point and adjusting the instantaneous rate of addition or removal of heat through the heat exchanger to maintain the temperature of the lasing gas in the discharge chamber, as read by the temperature sensor, essentially constant.

19. The method of claim 18, wherein the method further comprises maintaining the amount of said lasing gas essentially constant by adding a consumable gas during operation of the laser.

20. The method of claim 18 wherein the lasing gas of said method comprises a noble gas halide under lasing conditions.

21. The method of claim 18 wherein the function of adjusting the instantaneous rate of removal of heat through the heat exchanger to maintain the temperature of the lasing gas in the discharge chamber, as read by the temperature sensor, essentially constant comprises passing a heat-exchange liquid through said heat exchanger under conditions sufficient to remove heat from said lasing gas.

22. The method of claim 21 wherein the heat-exchange liquid used to remove heat from the lasing gas flows through components, at least one of which components is positioned within the discharge chamber and at least one of which components is positioned outside the discharge chamber but within a housing which encloses the discharge chamber, and wherein the components that are positioned outside the discharge chamber but within the housing are positioned within a sub-assembly.

23. The method of claim 21 wherein the function of adjusting the instantaneous rate of removal of heat through the heat exchanger to maintain the temperature of the lasing gas in the discharge chamber, as read by the temperature sensor, essentially constant is performed by controlling the flow of said heat-exchange liquid through said heat exchanger by passing the heat-exchange liquid through a flow-proportioning valve and regulating the flow rate of said heat-exchange fluid using said flow-proportioning valve.

24. The method of claim 23 wherein the flow-proportioning valve through which said heat-exchange fluid passes is a 3-way valve.

25. The method of claim 23 wherein the temperature sensor is a temperature sensor located in the lasing gas within the discharge chamber.

26. The method of claim 23 wherein the method further comprises selecting the lasing gas such that the lasing gas produces a noble metal halide under lasing conditions.

27. The method of claim 25 wherein the laser is an excimer laser.

28. The method of claim 18 wherein the temperature sensor is a temperature sensor located in the lasing gas.

29. The method of claim 18 wherein the temperature sensor is located in the portion of the lasing gas that is representative of the temperature of the bulk of the lasing gas that is being subjected to the energy that pumps electrons to an excited state.

30. The method of claim 29 wherein the temperature sensor is a thermocouple.

31. The method of claim 30 wherein the thermocouple is positioned in the lasing gas within the discharge chamber.

32. The method of claim 29 wherein the temperature sensor is a semiconductor temperature sensor.

33. The method of claim 32 wherein the semiconductor temperature sensor is positioned in the lasing gas within the discharge chamber.

34. A method for generating a laser beam having improved uniformity from a laser having a discharge chamber, a volume of lasing gas, a temperature sensor that generates a temperature signal indicative of the lasing gas temperature, and a heat exchanger for adding heat to or removing heat from the lasing gas, said method comprising a) stimulating photon emission from the lasing gas in the discharge chamber of the laser, b) comparing the lasing gas temperature as indicated by the temperature signal to a set-point, and c) adjusting the instantaneous rate of addition or removal of heat through the heat exchanger to maintain the temperature of the lasing gas, as read by the temperature sensor, essentially constant.

35. A photolithography method comprising a) placing a photoresist on a substrate, and b) patterning the photoresist with a laser beam, wherein the laser beam is generated by a laser having a discharge chamber, a volume of lasing gas, a temperature sensor that generates a temperature signal indicative of the lasing gas temperature, and a heat exchanger for adding heat to or removing heat from the lasing gas, and wherein the laser beam is generated by the method comprising stimulating photo emission from the lasing gas in the discharge chamber of the laser; comparing the lasing gas temperature as indicated by the temperature signal to a set-point; and adjusting the instantaneous rate of addition or removal of heat through the heat exchanger to maintain the temperature of the lasing gas, as read by the temperature sensor, essentially constant.

36. A photolithography method comprising
a) placing a photoresist on a substrate, and
b) patterning the photoresist with a laser beam generated by a laser which comprises a discharge chamber for generating a laser beam; a lasing gas within said discharge chamber; a temperature sensor positioned to read the temperature of said lasing gas and thermally optimized by utilizing materials having a small thermal time constant, to generate a real-time temperature signal indicative of the lasing gas temperature; and a heat exchange system positioned to add heat to or remove heat from the lasing gas, wherein the heat exchange system comprises a heat exchanger whose rate of heat exchange is continuously variable in response to the temperature signal, and the rate of heat exchange is adjusted in response to a real-time temperature signal from the temperature sensor.

* * * * *